(12) United States Patent  
Asai

(10) Patent No.: US 8,564,809 B2
(45) Date of Patent: Oct. 22, 2013

(54) PRINTING SYSTEM FOR MAINTAINING CONFIDENTIALITY OF PRINT JOBS

(75) Inventor: Daisuke Asai, Aichi (JP)

(73) Assignee: Brother Kogyo Kabushiki, Nagoya (JP)

( * ) Notice: Subject to any disclaimer, the term of this patent is extended or adjusted under 35 U.S.C. 154(b) by 1177 days.

(21) Appl. No.: 12/189,855

(22) Filed: Aug. 12, 2008

(65) Prior Publication Data

US 2009/0046311 A1    Feb. 19, 2009

(30) Foreign Application Priority Data

Aug. 15, 2007  (JP) ................. 2007-211867

(51) Int. Cl.
*G06F 3/12* (2006.01)
(52) U.S. Cl.
USPC ........... 358/1.15; 358/1.1; 358/1.14; 358/1.9; 713/170; 713/168; 726/2; 726/26; 726/27; 726/28
(58) Field of Classification Search
None
See application file for complete search history.

(56) References Cited

U.S. PATENT DOCUMENTS

| | | | |
|---|---|---|---|
| 6,160,629 A * | 12/2000 | Tang et al. ................. | 358/1.1 |
| 6,424,429 B1 | 7/2002 | Takahashi et al. | |
| 7,315,987 B2 | 1/2008 | Tanaka et al. | |
| 2004/0021584 A1* | 2/2004 | Hartz et al. ............... | 340/995.24 |
| 2007/0177204 A1* | 8/2007 | Kamasuka et al. ......... | 358/1.15 |
| 2008/0186542 A1* | 8/2008 | Martin et al. ................ | 358/1.18 |

FOREIGN PATENT DOCUMENTS

| | | |
|---|---|---|
| JP | 11-143907 | 5/1999 |
| JP | 2003-208448 | 7/2003 |
| JP | 2004-181775 A | 7/2004 |
| JP | 2006-035698 A | 2/2006 |
| JP | 2006-172045 | 6/2006 |
| JP | 2006-227707 | 8/2006 |
| JP | 2007-081717 | 3/2007 |

OTHER PUBLICATIONS

Fujita, Japanese Application No. 2004-181775, published Jul. 2, 2004, machine translation.*
Ebara, Japanese Published Application No. 2007-081717, Mar. 2007, Machine Translation.*
JP Office Action dtd Mar. 17, 2009, JP Appln. 2007-211867.

* cited by examiner

*Primary Examiner* — Paul F Payer
(74) *Attorney, Agent, or Firm* — Banner & Witcoff, Ltd.

(57) ABSTRACT

A printing apparatus to process a print job is provided. The printing apparatus includes a printing unit to form an image according to print data, a displaying device to display information concerning an operation of the printing apparatus, a first storage unit to store first user information, which identifies a user of an information processing apparatus, in association with a user-specific thumbnail image, which is to be displayed in the displaying device to identify the print job provided by the user, a first judging unit to determine as to whether the print job includes first security information, which is specified by the user to prevent contents of the print data from being disclosed, and the first user information, and a first display control unit to display the user-specific thumbnail image when the first judging unit determines that the print job includes the first security information and the first user information.

17 Claims, 8 Drawing Sheets

PRINTING SYSTEM FOR MAINTAINING CONFIDENTIALITY OF PRINT JOBS

CROSS REFERENCE TO RELATED APPLICATION

This application claims priority from Japanese Patent Application No. 2007-211867, filed on Aug. 15, 2007, the entire subject matter of which is incorporated herein by reference.

BACKGROUND

1. Technical Field

An aspect of the present invention relates to a printing apparatus, a computer usable medium therefor, and a display device.

2. Related Art

In a printing system having a printer and a plurality of terminal computers which share the printer, for example, a printed material made by one user can be easily viewed by another. Thus, maintaining confidentiality of contents of the printed material can be difficult.

In order to maintain the confidentiality, a printing apparatus capable of being operated in a secure printing mode, in which a print job requested by a user is paused temporarily and resumed when the user enters security information such as a password to the printing apparatus through an operation panel, has been used. When the print job is paused, data concerning the print job can be stored in a storage unit such as an HDD (hard disk drive).

In this configuration, however, data concerning a plurality of print jobs other than the print job requested by the current user can be stored as well. Therefore, it is necessary for the user to search for the requested print job among the plurality of print jobs to designate. Thus, when the plurality of print jobs stored in the HDD are many, finding the correct print job may be troublesome.

In order to solve the trouble, thumbnail images representing the print jobs can be presented on a display device such as an LCD (liquid crystal display) panel provided to the printing apparatus, and the user can view the thumbnail images to rather easily determine the current print job.

It is to be noted, however, that the thumbnail images represent the images to be printed in the print jobs, and the contents of the print job can be exposed to the other users who views the thumbnail images searching for their requested print jobs. Thus, confidentiality of the print jobs can be again risked.

In consideration of such drawbacks, an image forming apparatus, which is capable of displaying a solid black image to represent a confidential print job and a normal thumbnail image to represent a non-confidential print job so that the thumbnail image of the confidential print job can be prevented from being exposed, is disclosed in Japanese Patent Provisional Publication 2007-81717, for example.

SUMMARY

In the above-referenced image forming apparatus, the print jobs to be printed in the secure printing mode are represented by the solid black images; therefore, the contents of the print job is unrecognizable, and the user is again urged to have trouble finding the requested print job when a plurality of confidential print jobs are stored in the HDD.

In consideration of the above drawbacks, the present invention is advantageous in that a printing apparatus, a computer usable medium, and a display device, in which confidentiality of the print job is maintained and the trouble to search for the requested print job is eased, is provided.

According to an aspect of the present invention, a printing apparatus to process a print job provided from an information processing apparatus is provided. The printing apparatus includes a printing unit to form an image on a recording medium according to print data including image data which represents the image to be formed, a displaying device to display information concerning an operation of the printing apparatus, a first storage unit to store first user information, which identifies a user who uses the information processing apparatus to provide the print job to the printing apparatus, in association with a user-specific thumbnail image, which is to be displayed in the displaying device to identify the print job provided by the user, a first judging unit to determine as to whether the print job provided by the user through the information processing apparatus includes first security information, which is specified by the user to prevent contents of the print data from being disclosed, and the first user information, and a first display control unit to display the user-specific thumbnail image stored in the first storage unit in the displaying device when the first judging unit determines that the print job provided by the user includes the first security information and the first user information.

According to another aspect of the present invention, a printing system to process a print job to form an image on a recording medium is provided. The printing system includes an information processing apparatus, which generates print data including image data to represent the image to be formed, a printing apparatus to process the print job provided from the information processing apparatus. The information processing apparatus includes an information appending unit to append first security information, which is specified by a user to prevent contents of the print data from being disclosed, and first user information, which identifies the user, to the print job. The printing apparatus includes a printing unit to form the image on the recording medium according to the print data, a displaying device to display information concerning an operation of the printing apparatus, a first storage unit to store the first user information in association with a user-specific thumbnail image, which is to be displayed in the displaying device to identify the print job provided by the user, a first judging unit to determine as to whether the print job provided by the user through the information processing apparatuses includes the first security information and the first user information, and a first display control unit to display the user-specific thumbnail image stored in the first storage unit in the displaying device when the first judging unit determines that the print job provided by the user includes the first security information and the first user information.

According to another aspect of the present invention, a displaying device to display a thumbnail image representing a different-sized image is provided. The displaying device includes a displaying unit to display information concerning an operation of the displaying device, a first storage unit to store first user information, which identifies a user of the different-sized image, in association with a user-specific thumbnail image, which is to be displayed in the displaying unit to identify the different-sized image, a first judging unit to determine as to whether a data file representing the different-sized image includes first security information, which is specified by the user to prevent contents of the different-sized image from being disclosed, and the first user information, and a first display control unit to display the user-specific thumbnail image stored in the first storage unit in the displaying device when the first judging unit determines that the data file representing the different-sized image includes the first security information and the first user information.

According to another aspect of the present invention, a method to control displaying a thumbnail image representing a print job is provided. The method includes generating print data including image data to represent an image to be formed in the print job, storing first security information, which is specified by a user to prevent contents of the print data from being disclosed, in a first storage unit in association with a user-specific thumbnail image, which is to be displayed in a displaying device to identify the print job provided by the user, appending first security information and first user information, which identifies the user, to the print job, judging as to whether the print job provided by the user includes the first security information and the first user information, and controlling display of the user-specific thumbnail image stored in the first storage unit in the displaying device when it is judged that the print job provided by the user includes the first security information and the first user information.

According to another aspect of the present invention, a computer usable medium including computer readable instructions to control a computer to display a thumbnail image representing a print job is provided. The computer is controlled by steps of generating print data including image data to represent an image to be formed in the print job, storing first security information, which is specified by a user to prevent contents of the print data from being disclosed, in a first storage unit in association with a user-specific thumbnail image, which is to be displayed in a displaying device of the computer to identify the print job provided by the user, appending first security information and first user information, which identifies the user, to the print job, judging as to whether the print job provided by the user includes the first security information and the first user information, and controlling display of the user-specific thumbnail image stored in the first storage unit in the displaying device when it is judged that the print job provided by the user includes the first security information and the first user information.

According to the above configurations, the user-specific thumbnail image associated with the first user information is displayed in place of a representative thumbnail image, which is created based on the contents of the print data. Therefore, the confidentiality of the print data can be maintained, and the trouble to search for the correct print job to be printed is eased.

It is to be noted that the print data is the data to be processed to be printed, and can include data created by an application program such as word processor, data obtained through a scanner, and data obtained from an external device such as a digital camera and a USB memory.

BRIEF DESCRIPTION OF THE ACCOMPANYING DRAWINGS

FIG. 1 is a block diagram to schematically illustrate a printing system 1 according to a first embodiment of the present invention.

FIG. 2 schematically illustrates a window to be displayed in a display unit 11 of a PC (personal computer) 10 for registering a user-specific thumbnail image in the PC 10 according to the first embodiment of the present invention.

FIG. 3 schematically illustrates the registered user information to be managed in the PC 10 according to the first embodiment of the present invention.

FIG. 4 schematically illustrates a window to be displayed in the display unit 11 of the PC 10 when a print instruction is provided to the PC 10 according to the first embodiment of the present invention.

FIG. 5 schematically illustrates thumbnail images to be displayed in a display panel 22 of a printer 20 operated in a secure printing mode according to the first embodiment of the present invention.

Figure 8:
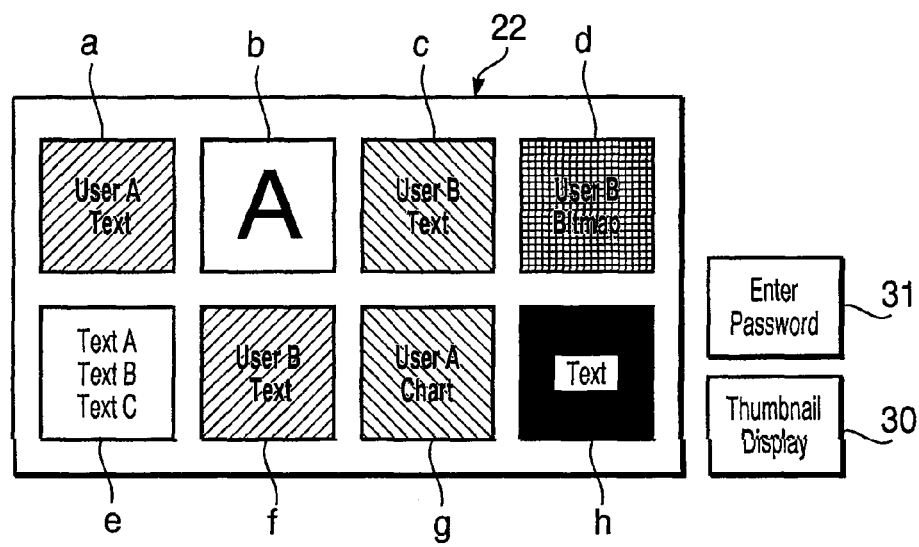

FIG. 8 schematically illustrates a display panel 22 and its surrounding of a printer 20 according to a second embodiment of the present invention.

Figure 9:
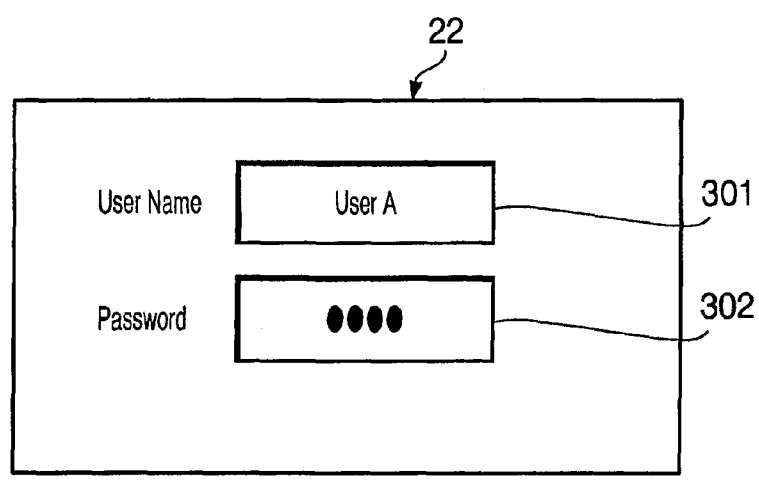

FIG. 9 schematically illustrates a window to be displayed in the display panel 22 when a password enter button 31 is operated in the printer 20 according to the second embodiment of the present invention.

Figure 10:
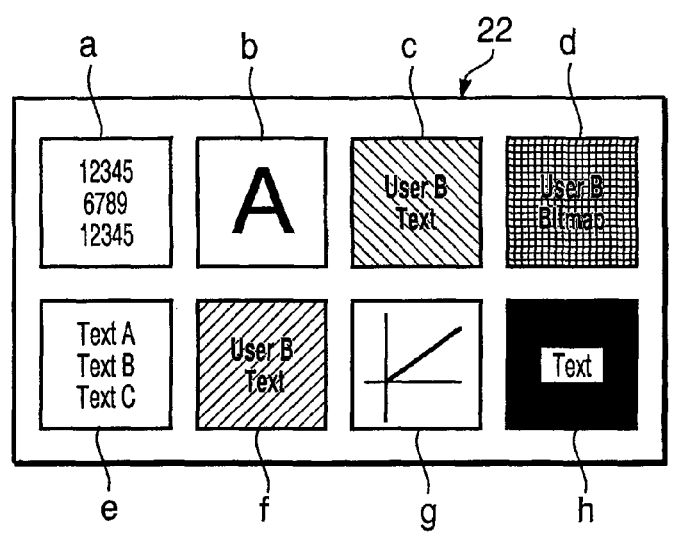

FIG. 10 schematically illustrates images to be displayed in the display panel 22 according to the second embodiment of the present invention.

Figure 11:
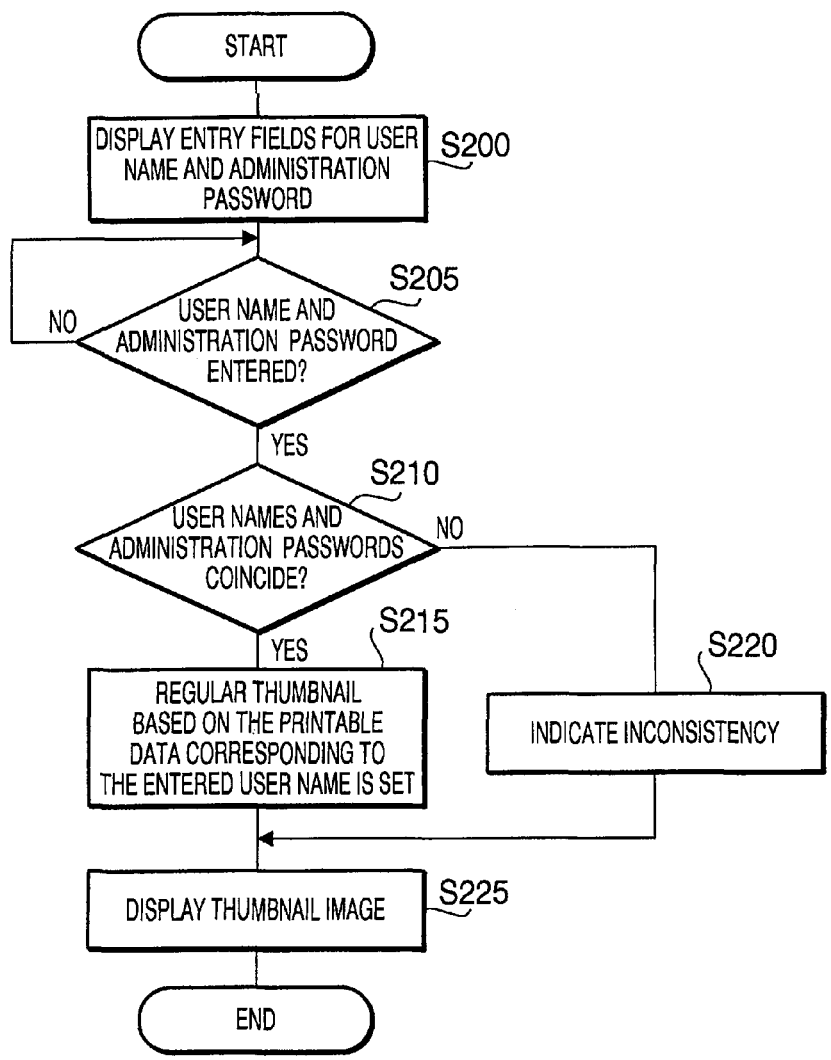

FIG. 11 is a flowchart to illustrate a process to be activated when the password enter button 31 is operated in the printer 20 according to the second embodiment of the present invention.

DETAILED DESCRIPTION

Hereinafter, embodiments according to aspects of the present invention will be described with reference to the accompanying drawings.

Figure 1:
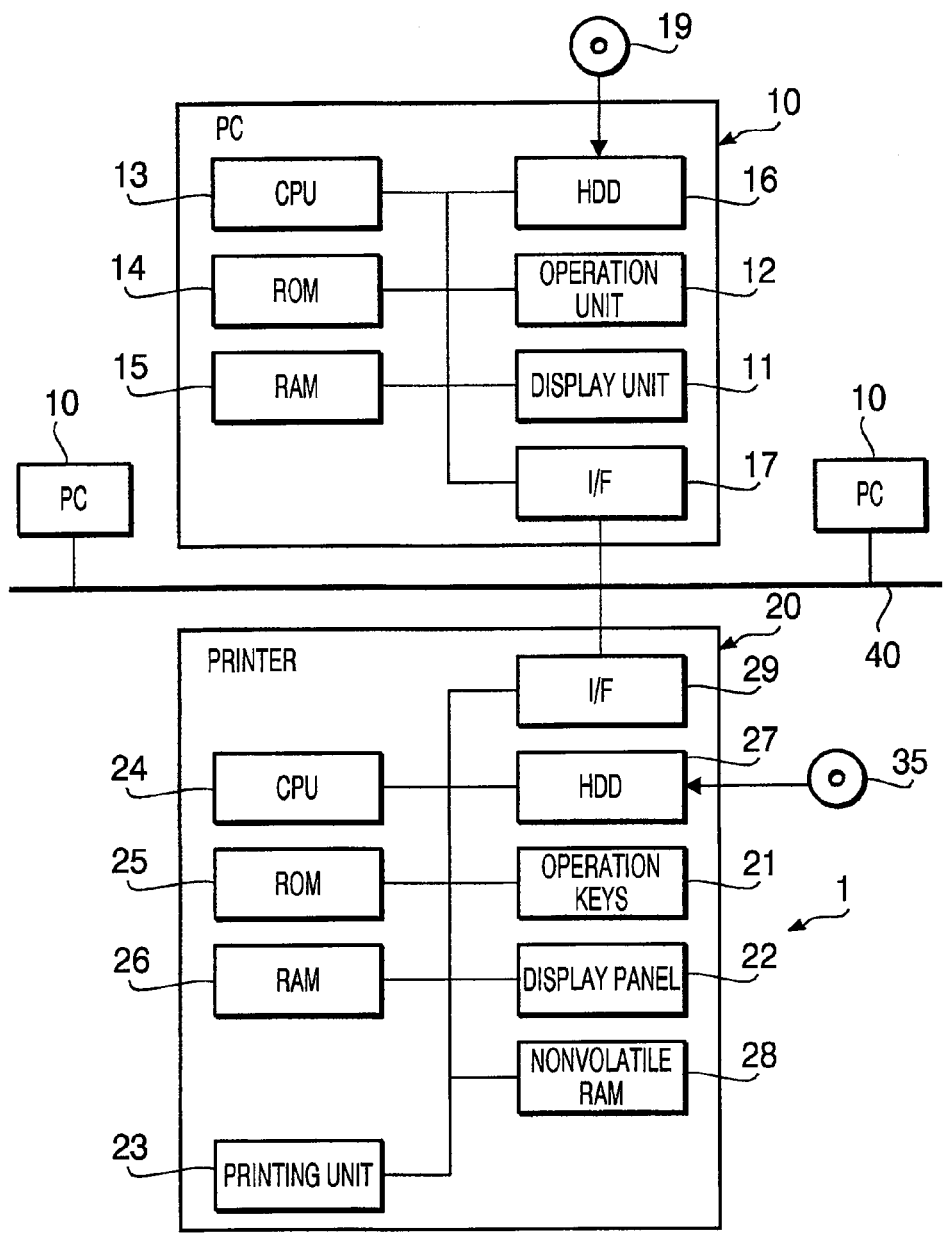

FIG. 1 is a block diagram to schematically illustrate a printing system 1 according to a first embodiment of the present invention. The printing system 1 includes a plurality of PCs (personal computers) 10 and a printer 20. Each of the PCs 10 is an information processing apparatus having a display unit 11, an operation unit 12, a CPU 13, memory units including a ROM 14, a RAM 15, and an HDD 16, and an I/F (interface) unit 17, through which PC 10 is connected with a LAN (local area network) 40 and with external devices.

The display unit 11 includes a displaying screen (not shown) such as an LCD (liquid crystal display) and a CRT (cathode-ray tube) to display images (including figures and characters). The operation unit 12 includes a pointing device such as a mouse (not shown) to move a pointer (not shown), which specifies a desired portion on the screen, and a keyboard (not shown).

The printer 20 includes operation keys 21, through which a user enters selection of usable functionality of the printer 20 and various parameters to operate the printer 20, a display panel 22 to display various operational information concerning the printer 20 such as operation status, a printing unit 23 to form an image on a recording medium such as paper, a CPU 24 to control each unit in the printer 20, memory units such as a ROM 24, a RAM 26, and an HDD 27.

The display panel 22 according to the present embodiment is configured to be a so-called touch sensitive panel, which is capable of detecting a position thereon being touched by the user. Thus, instructions concerning the operation of the printer 20 can be entered through the display panel.

The printer 20 further includes a nonvolatile RAM 28, which is a memory unit capable of maintaining stored data even when power supply thereto is stopped, and an I/F unit 29, through which the printer 20 is connected with the LAN 40 and to the PCs 10. Thus, the printer 20 can be shared with the plurality of PCs 10 provided in the network.

The operations of the printing system 1 according to the present embodiment are controlled by programs, such as a printer driver 19, which is installed in a storage unit (e.g., the HDD 16) and run in the PCs 10, and a controlling program 35, which is installed in a storage unit (e.g., the HDD 27) and run in the printer 20.

Figures 2, 3:
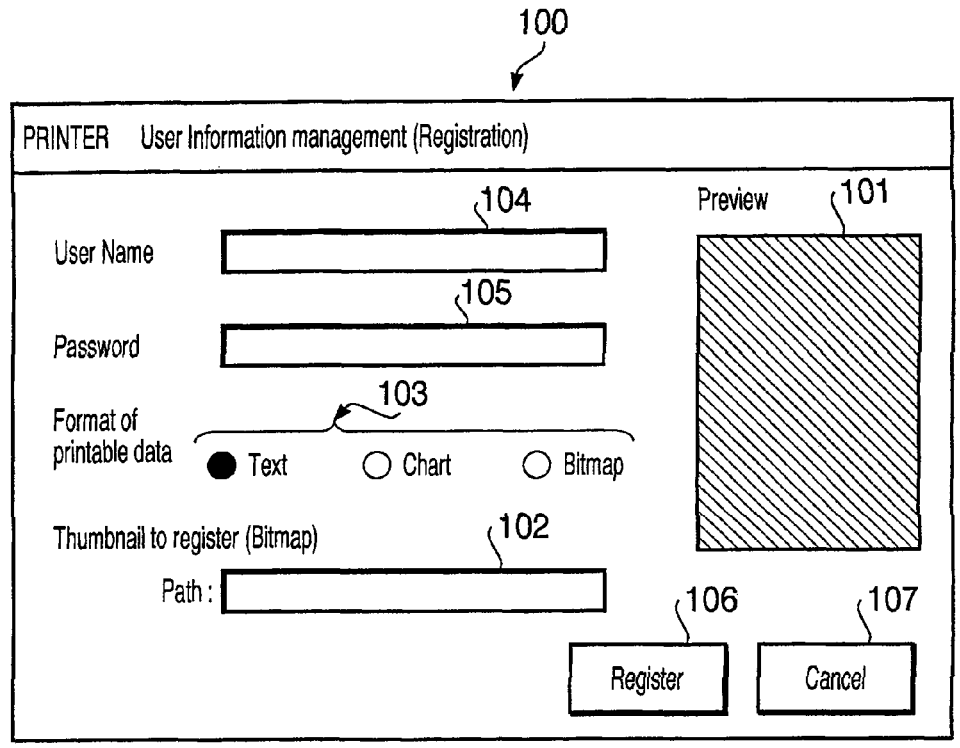

FIG. 2 schematically illustrates a user information management interface window 100 to be displayed in the display unit 11 of the PC 10 for registering a user-specific thumbnail image to be displayed in the PC 10 according to the first embodiment of the present invention. The user information management interface window 100 is activated when a property of the printer 20 being registered in the OS (operating system) of the PC 10 is opened to be edited.

The thumbnail image according to the present embodiment refers to an image identifying print data which is requested by the user to be printed (i.e., a print job) and to be displayed in the display panel 22 of the printer and in the display unit 11 of the PC 10. The thumbnail image is configured with a smaller number of pixels than pixels constituting a display area of the display panel 22.

The user information management interface window 100 includes a preview area 101, in which an image to be registered as the thumbnail image is displayed, a path field 102, in which a path for the image to be registered as the thumbnail image is entered. When the path for the image is entered, image data stored in a location indicated by the path is referred to, and the image according to the image data is displayed in the preview area 101.

According to the present embodiment, a data format of the image to be registered as the thumbnail image may be any format as long as it is recognizable to the OS. The path for the image data to be entered in the path field 102 may indicate a location within the HDD 16 and any other location, including a location in an internet site and in a removable medium, which can be accessed by the PC 10.

The user information management interface window 100 further includes document format buttons 103. In the present embodiment, one of three document formats (i.e., text, chart, and bitmap) is selected to be associated with the thumbnail image being registered. Therefore, one of the document format buttons 103 is selected according to the selection of the data format of the printable data to be represented by the thumbnail image being registered.

Further, a user name field 104 and a password field 105 are included in the user information management interface window 100. A name of the user who is to be corresponded to the thumbnail image is entered in the user name field 104. An administration password to authenticate that the user who is currently operating the user information interface window 100 is an authorized user to register the thumbnail image is entered in the password field 105.

Thus, when a register button 106 is operated, a set of the user name entered in the user name field 104 and the administration password entered in the password field 105 is referred to a set of a user name and an administration password stored in the nonvolatile RAM 28 of the printer 20. If the two sets coincide with each other, the current user is considered to be the authorized user who is allowed to edit the thumbnail image.

When the register button 106 is operated, the information (i.e., user information) as displayed in each field in the user information management interface window 100 is entered in the nonvolatile RAM 28 of the printer 20 to be registered. When a cancel button 107 is operated, the information as displayed in the user information management interface window 100 is canceled without being registered, and the user information management interface window 100 is terminated.

The information entered through the user information management interface window 100 is registered in the nonvolatile RAM 28. FIG. 3 schematically illustrates the user information registered in the nonvolatile RAM 28 through the user information management interface window 100 according to the first embodiment of the present invention.

When the register button 106 is operated, and if a set of the user name entered in the user name field 104, the administration password entered in the password field 105, and the selected format of the printable data indicated by the document format buttons 103 coincides with a set of the user name, the password, and the format of the printable data currently stored in the nonvolatile RAM 28 of the printer 20, the image data currently registered as the thumbnail image in correspondence with the currently stored set of the user name, the password, and the format of the printable data is replaced with the image data defined by the path newly inputted and displayed in the path field 102.

If a combination of the user name and the administration password is registered, but the administration password entered in the password field 105 does not coincide with the currently registered administration password, the information being displayed in each field in the user information management interface window 100 is not stored in the nonvolatile RAM 28, and a message to notify the user of the cancellation of the information is displayed in the display unit 11.

In the nonvolatile RAM 28 of the printer 20 according to the present embodiment, a default thumbnail image, which is not corresponded to any user or administration password, is preparatorily stored for each format of the printable data (see a rightmost column in FIG. 3). It is to be noted in FIG. 3 that solely one default thumbnail image to be associated with one of the data formats (i.e., text) is presented as an example; however, default thumbnail images are prepared for the remaining data formats which can be selected by the document format buttons 103 (i.e., chart and bitmap in the present embodiment) as well. The registered user information concerning a set of the user name, the data format of the printable data, and the thumbnail image is referred to as thumbnail information in the present embodiment.

Figure 4:
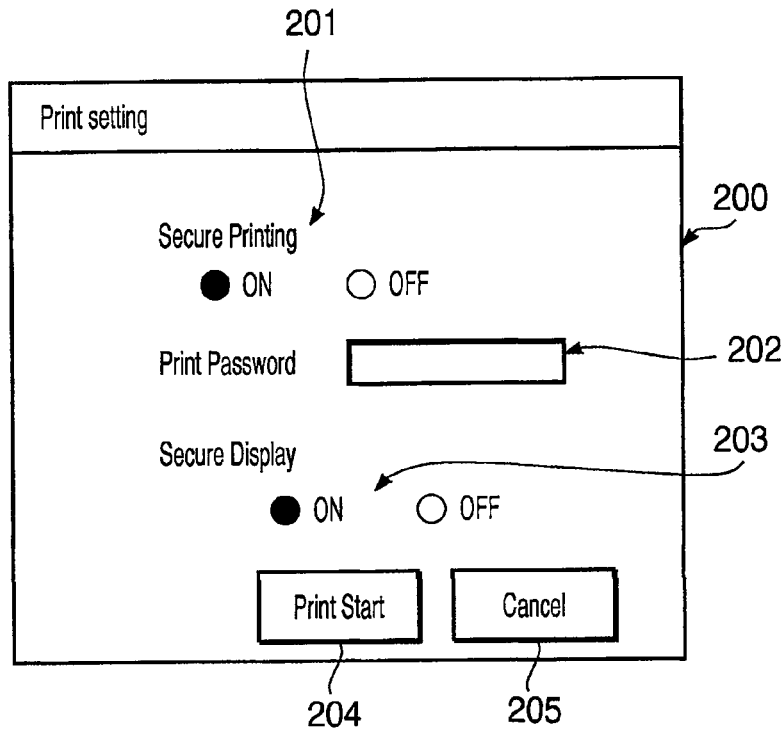

FIG. 4 schematically illustrates a print setting user interface window 200 to be displayed in the display unit 11 of the PC 10 when a print instruction is provided to the PC 10 according to the first embodiment of the present invention. The print setting user interface window 200 is activated and displayed in the display unit 11 of the PC 10 when a print instruction is given to the PC 10 by the user.

It is to be noted that the printable data to be printed according to the print instruction can be derived from a memory medium which is included in the PC 10 such as the HDD 16 and from an external removable medium such as a USB memory (not shown).

The printer 20 according to the present embodiment can print an image in a secure printing operation. The secure printing operation refers to a printing operation in a secure printing mode, which is initiated when the print instruction is given through the operation unit 12 of the PC 10 by the user, the print data is transmitted from the PC 10 to the printer 20, the transmitted print data is paused and temporarily stored in the HDD 27 of the printer, and the current user enters security information (e.g., a password) through the operation keys 21 of the printer 20 to protect the contents of the print data from being unintentionally disclosed to another user. The security information entered by the current user is referred to as a print password in the present embodiment.

The print setting user interface window 200 shown in FIG. 4 is a user interface through which the user can configure preference of the secure printing operation. The print setting user interface window 200 includes secure printing activation/inactivation buttons 201, through which the user can activate and inactivate the secure printing operation. The print setting user interface window 200 further includes a print password field 202, in which the user can enter to specify the print password. The print password field 202 can be activated when the user selects "ON" of the secure printing activation/inactivation buttons 201 and can accept entry of the print password from the user. When the user selects "OFF" of the secure printing activation/inactivation buttons 201, the print password field 202 is displayed in gray, and the user's entry cannot be accepted.

Furthermore, the print setting user interface window 200 includes secure display activation/inactivation buttons 203, through which the user can select as to whether the thumbnail image to represent the print data to be a protected thumbnail image or a regular thumbnail image.

The protected thumbnail image according to the present embodiment refers to a user-specific thumbnail image which is preparatorily registered image in association with the thumbnail information (see FIG. 3). When the secure display is activated through an "ON" button of the secure display activation/inactivation buttons 203, the preparatorily registered and user-specific protected thumbnail image is displayed in place of a regular thumbnail image which is created based on the contents of the printable data and represents the image to be printed.

In the present embodiment, the secure display activation/inactivation buttons 203 are selectable when the secure printing operation is activated through the "ON" button of the secure printing activation/inactivation buttons 201. When the secure printing operation is inactivated, the secure display activation/inactivation buttons 203 are displayed in gray, and the user cannot select either of the secure display activation/inactivation buttons 203.

The print setting user interface window 200 further includes a print start button 204. When the print start button 204 is operated, the print data is generated based on the image to be printed, and the information provided through the print setting user interface window 200 is appended to the print data.

More specifically, when the print start button 204 is operated, data in a specific format which can be processed by the printer 20 (e.g., PDL (page description language) format) is generated (i.e., print data). In addition, the information to indicate activation/inactivation of the secure printing operation, the print password, the information to indicate activation/inactivation of the secure display, the information to indicate the format of the printable data, and the user name to identify the user who provided the print instruction are added to the print data. In the present embodiment, the user name is automatically extracted from user information which is obtained when the user logs on the PC 10. The print data generated as above is transmitted to the printer 20 and stored in the HDD 27 of the printer 20. It is to be noted that, when the secure printing operation is inactivated, the print data is sequentially processed to be printed.

When a cancel button 205 in the print setting user interface window 200 is operated, no print data is generated, and the print setting user interface window 200 is terminated.

Figure 5:
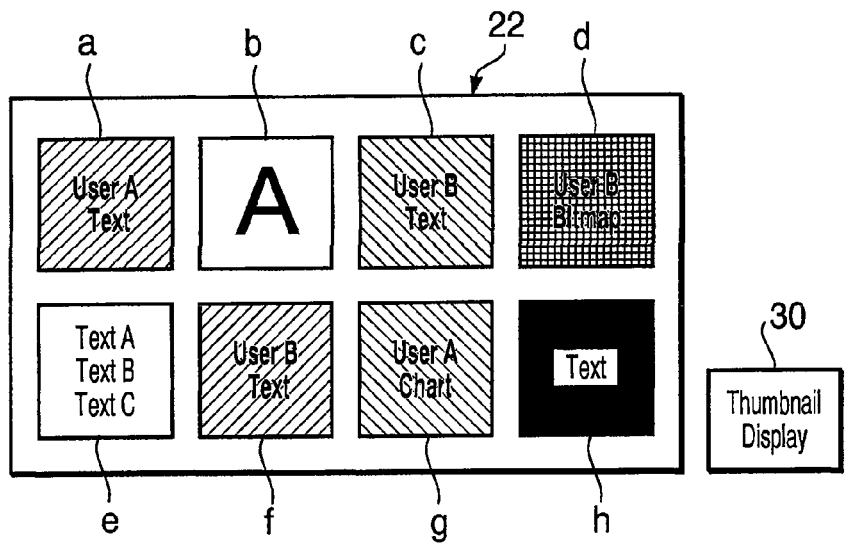

FIG. 5 schematically illustrates the thumbnail images a-h to be displayed in the display panel 22 of the printer 20 being operated in the secure printing mode according to the first embodiment of the present invention. The thumbnail images a-h are displayed in the operation panel 22 when a thumbnail display button 30, which is provided in the vicinity of the operation panel 22, is operated.

The thumbnail image a represents print data being text data and that the print operation of the text data is instructed by a user A. The thumbnail image b represents the image to be printed, and the thumbnail image b is generated based on the image to be printed. The thumbnail image c represents print data being text data and that the print operation of the text data is instructed by a user B. The thumbnail image d represents print data being bitmap data and that the print operation of the bitmap data is instructed by the user B. The thumbnail image e represents the image to be printed, and the thumbnail image e is generated based on the image to be printed. The thumbnail image f represents print data being text data and that the print operation of the text data is instructed by the user B. The thumbnail image g represents print data being chart (graphics) image data and that the print operation of the chart image data is instructed by the user A. The thumbnail image h is a default thumbnail image which is not associated with any user or a password.

Figure 6:
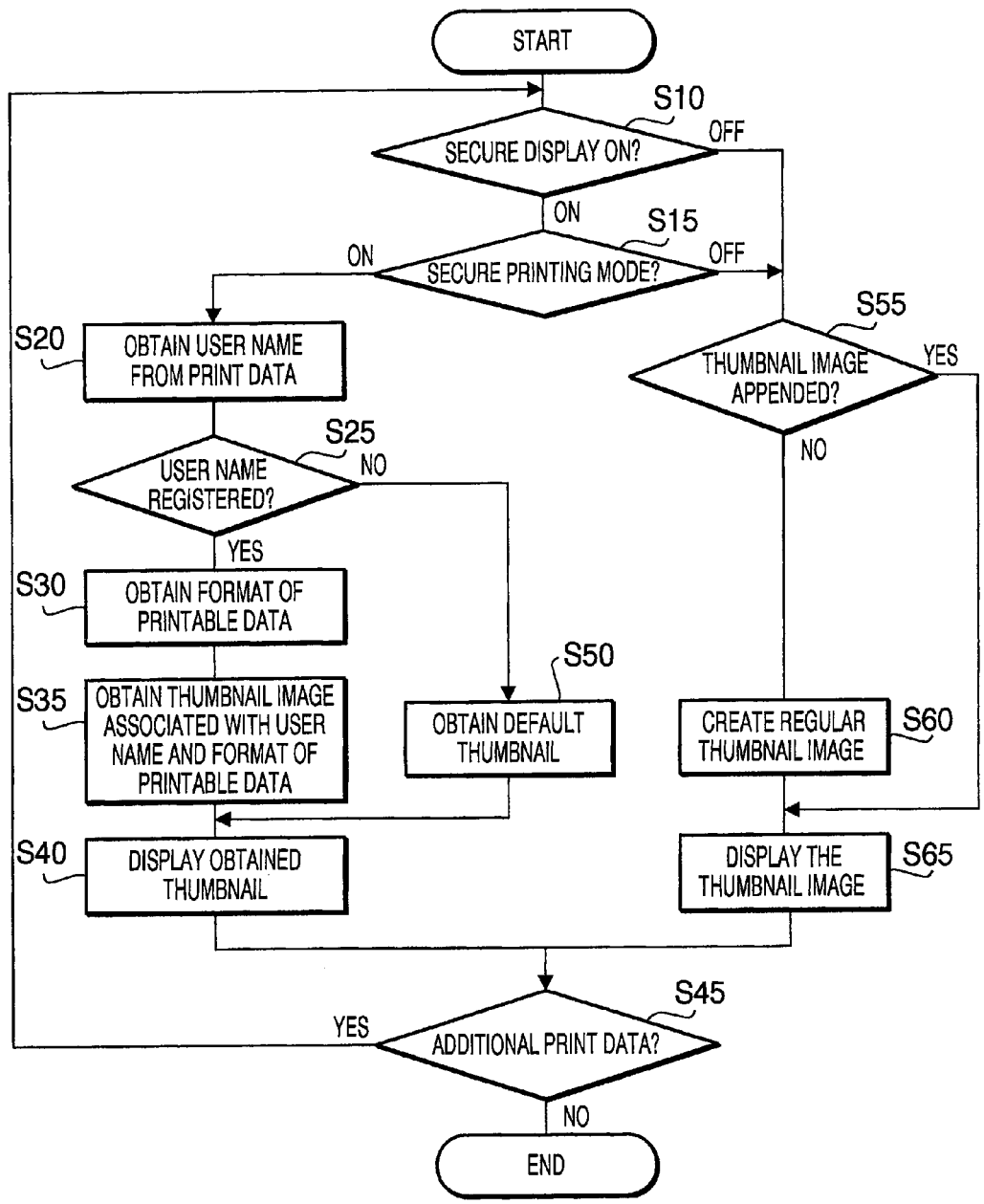
FIG. 6 is a flowchart to illustrate a process to display the thumbnail images performed in the printer 20 according to the first embodiment of the present invention.

FIG. 6 is a flowchart to illustrate a process to display the thumbnail images performed in the printer 20 according to the first embodiment of the present invention. The process is activated when the thumbnail display button 30 is operated. As the process starts, in S10, a piece of the print data stored in the HDD 27 is obtained by the CPU 24, and it is judged to determine based on the information appended to the print data as to whether the secure display is activated.

If the secure display is activated (S10: ON), in S15, it is judged to determine as to whether the secure printing mode is activated. If the secure printing mode is activated (S15: ON), in S20, the user name is extracted from the print data. Thereafter, in S25, it is determined as to whether the extracted user name is registered in the registered user information in the printer 20.

In S25, if the extracted user name is registered in the printer 20 (S25: YES), in S30, the format of the printable data is obtained from the information appended to the print data. Thereafter, in S35, a thumbnail image associated with the user name and the format of the printable data is obtained based on the thumbnail information.

Thereafter, in S40, the thumbnail image obtained in S35 is displayed in the display panel 22, and in S45, it is determined as to whether an additional piece of print data is stored in the HDD 27. In S45, if an additional piece of print data is stored (S45: YES), the process returns to S10. In S45, if no additional piece of print data is stored (S45: NO), the process is terminated.

In S25, if the user name is not registered in the printer 20 (S25: NO), in S50, a default thumbnail image is obtained, and in S40, the obtained thumbnail image is displayed in the display panel 22 of the printer 20. Thereafter, in S45, it is determined as to whether an additional piece of print data is stored in the HDD 27.

In S10, if the secure display is inactivated (S10: OFF), and in S15, if the secure printing mode is inactivated (S15: OFF), in S55, it is determined as to whether image data specifically for a thumbnail image is appended to the print data.

In S55, if no image data for a thumbnail image is appended to the print data (S55: NO), in S60, a regular thumbnail image is created based on the print data and the image to be printed. In S65, the created regular thumbnail image is displayed in the display panel 22. Thereafter, in S45, it is determined as to whether an additional piece of print data is stored in the HDD 27.

Meanwhile, in S55, if image data specifically for a thumbnail image is appended to the print data (S55: YES), in S65, the appended thumbnail image is displayed in the display panel 22 of the printer 20. Thereafter, the process proceeds to S45.

Figure 7:
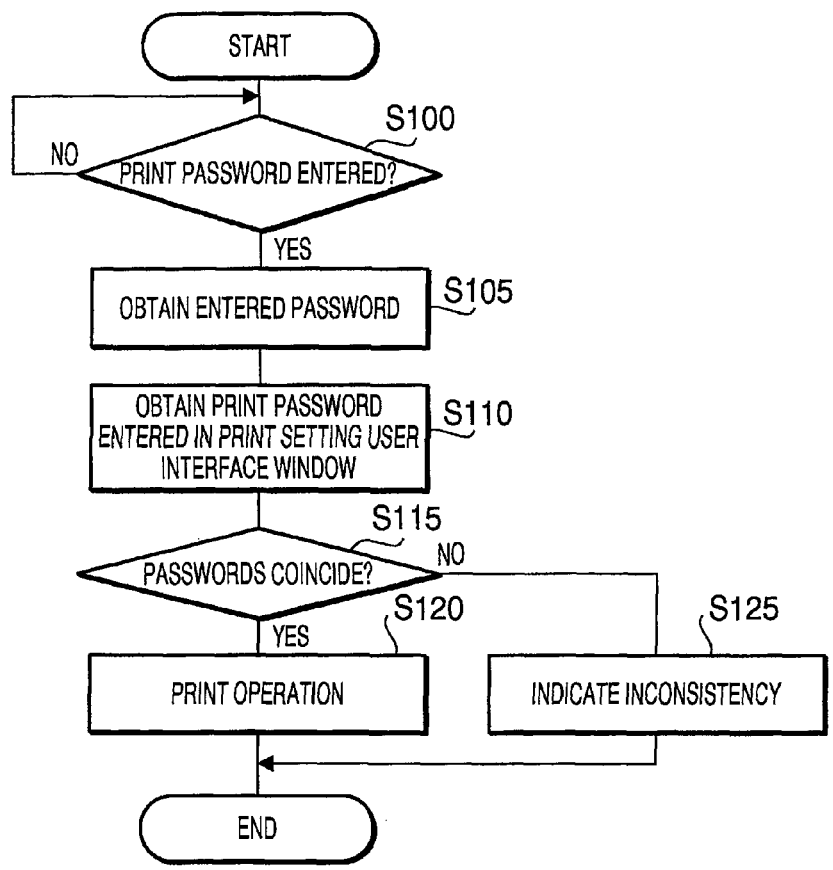
FIG. 7 is a flowchart to illustrate a process to be performed in the printer 20 operated in the secure printing mode according to the first embodiment of the present invention.

FIG. 7 is a flowchart to illustrate a process to be performed in the printer 20 being operated in the secure printing mode according to the first embodiment of the present invention. The process is activated when the user selects one of the thumbnail images displayed in the display panel 22.

When the process is activated, in S100, a message to prompt the user to enter a print password and an entry field for the print password are displayed in the display panel 22. Further, it is determined as to whether the print password is entered.

In S100, the print password is entered (S100: YES), in S105, the entered password is obtained. Thereafter, in S110, a print password previously entered when the print instruction is given in the print password field 202 of the print setting user interface window 200 (see FIG. 4) is obtained.

Thereafter, in S115, the print password obtained in S105 and the print password obtained in S110 are examined as to whether they coincide with each other. If the two print passwords coincide (S115: YES), in S120, the print data is processed to be printed, and the process is terminated.

In S115, if the two print passwords do not coincide with each other (S115: NO), the print data is not processed to be printed, and in S125, a message to indicate the inconsistency is displayed in the display panel 22. The process is terminated thereafter.

According to the present embodiment, when information concerning the user name and the print password corresponding to the user is appended to the print data, the thumbnail image associated with the user name is displayed in the display panel 22 for the user to view.

Therefore, the thumbnail image associated with the user name can be displayed in place of a regular thumbnail image representing the image to be printed so that the user can recognize the displayed thumbnail image while the contents of the image to be printed can be prevented from being exposed to the other users. Thus, confidentiality of the contents of the printed image can be maintained, and selection of the print data to be printed can be easily made based on the thumbnail image.

Further, according to the present embodiment, when no thumbnail image associated with a specific user is registered during a secure printing operation, a default thumbnail image in place of a regular thumbnail image representing the image to be printed can be displayed in the display panel 22. Therefore, the contents of the image to be printed can be prevented from being exposed to the other users. Thus, confidentiality of the contents of the printed image can be maintained.

Furthermore, according to the present embodiment, a thumbnail image associated with a user name can be registered on the user basis. Therefore, the user can designate the thumbnail image representing the user himself/herself to be registered so that usability of the printer 20 can be improved.

In addition, the thumbnail image is associated with the user and with the format of the printable data; therefore, the user can recognize the contents of the image to be printed more clearly, and usability of the printer 20 can be improved.

In some instances, contents of a regular thumbnail image representing the image to be printed may not be recognizable to users who are other than a primary user who instructed the printing operation. Therefore, if the primary user determines that the regular thumbnail image will not risk the confidentiality of the document to be printed, according to the present embodiment, the secure display setting can be inactivated when the secure printing operation is activated. Meanwhile, usability for the primary user in selecting the print job to be performed based on the displayed thumbnail images can be maintained.

Further, according to the present embodiment, in S55 (FIG. 6), if image data specifically for a thumbnail image is appended to the print data (S55: YES), the appended thumbnail image is displayed in the display panel 22; therefore, contents of the print data can be easily recognized when the secure display is inactivated and when the secure printing mode is inactivated, and usability of the printer 20 can be improved.

Hereinafter, a second embodiment of the present invention will be described. In the present embodiment, an additional feature to display a thumbnail image, which is created based on information included in the print data, when the secure printing mode is activated and the security display is activated, is included.

FIG. 8 schematically illustrates the display panel 22 and its surrounding of the printer 20 according to the second embodiment of the present invention. It is to be noted that FIG. 8 is similar to FIG. 5 except that a password enter button 31 is provided. The other configuration of the components in the printing system 1 is similar to the configuration described in the first embodiment. When the password enter button 31 is operated with the thumbnail images being displayed in the display panel 22 as shown in FIG. 8, a process as shown in FIG. 11 is activated. Additionally, the process may be activated when the password enter button 31 is operated without the thumbnail images being displayed in the display panel 22 (not shown).

FIG. 11 is a flowchart to illustrate the process to be activated when the password enter button 31 is operated in the printer 20 according to the second embodiment of the present invention. As the process starts, in S200, a window including a user name field 301, in which a user name is entered, and a password field 302, in which an administration password is entered, is displayed in the display panel 22. FIG. 9 schematically illustrates the window to be displayed in the display panel 22 when the password enter button 31 is operated in the printer 20 according to the second embodiment of the present invention. In addition, a message (not shown) to prompt the user to enter the user name and the administration password is displayed in the window.

In S205, it is determined as to whether the user name and the administration password are entered. If the user name and the administration password are entered (S205: YES), in S210, it is determined as to whether the combination of the user name and the administration password coincides with a registered combination of a user name and an administration password, which are registered as the user information. In S205, if no entry of the user name and the administration password is detected (S205: NO), the process repeats S205.

In S210, if the two combinations coincide with each other (S210: YES), in S215, a regular thumbnail created based on the printable data and represents the image to be printed is set as the thumbnail image to be displayed in the display panel 22. Thereafter, in S225, thumbnail images respectively corresponding to the print jobs stored in the printer 20, including the regular thumbnail image set in S215, are displayed in the display panel 22. The process is terminated thereafter. FIG. 10 schematically illustrates the thumbnail images including the regular thumbnail images a and g being displayed in the display panel 22 in S225 according to the second embodiment of the present invention. In the present embodiment, it is assumed that the user A is the primary user who entered the user name and the administration password in S205; therefore, the regular thumbnail images which represent the images to be printed within the print jobs respectively (i.e., the thumbnail images a and g) are displayed (see also FIG. 8).

In S210, if the two combinations do not coincide with each other (S210: NO), in S220, a message (not shown) to indicate the inconsistency is displayed in the display panel 22. Thereafter, in S225, the thumbnail images corresponding to the print jobs stored in the printer 20 are displayed in the display panel 22, as shown in FIG. 8. The process is terminated thereafter.

In the above process, the regular thumbnail images representing the image of the print jobs instructed by the primary user A are displayed when the correct combination of the user name and the administration password is entered. Therefore, the regular thumbnail images a and g are exposed solely to the primary user A. Thus, the contents of the print data can be easily recognized, and usability for the primary user in selecting the print job to be performed based on the displayed thumbnail images can be maintained. Meanwhile, confidentiality of the contents of the print data can be maintained.

Although examples of carrying out the invention have been described, those skilled in the art will appreciate that there are numerous variations and permutations of the printing system that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the second embodiment, in S210, it is examined as to whether the combination of the user name and the administration password entered in the user name field 301 and the password field 302 respectively coincides with a registered combination of a user name and an administration password being registered as the user information. However, coincidence of the combination including the entered user name and the administration password with the combination including the user name and the print password appended to the print job may be examined. Thus, the regular thumbnail image may be displayed if it is determined that the two combinations coincide with each other.

For another example, the printing system 1 may not necessarily be configured solely with the PCs 10 and the printer 20. For example, the printing system may include an image reading apparatus (e.g., a scanner), which is connected to one of the PC 10 and the printer 20. In such a configuration, image data obtained by the reading apparatus can be transmitted to the PC 10 and the printer 20 to serve as the printable data. It is to be noted that the image data obtained by the reading apparatus being the printable data may not necessarily be processed in the printer 20 to be printed, but may be stored in the HDD 16 of the PC 10.

Further, the thumbnail information may not necessarily be stored in the HDD 27 of the printer 20, but may be stored in an externally provided memory medium which is connected with the printer 20 through a network.

Furthermore, the thumbnail information may not necessarily be configured and edited in the PC 10, but may be configured and edited in the printer 20, for example, through the operation keys 21 and the display panel 22.

The above-described embodiments may not necessarily be applied to a printing system, but may be applied to a display device for a PC, a digital camera, and the like, in which image data is represented by a thumbnail image.

What is claimed is:

1. A printing apparatus process a print job provided from an information processing apparatus, comprising:
    a printing unit configured to form an image on a recording medium according to print data including image data which represents the image to be formed;
    a displaying device configured to display information concerning an operation of the printing apparatus;
    a first storage unit configured to store first user information, which identifies a user who uses the information processing apparatus to provide the print job to the printing apparatus and is protected by a thumbnail registration password, in association with a user-specific thumbnail image, which is to be displayed in the displaying device to identify the print job provided by the user, and to store a security-unspecific thumbnail image without being associated with any user;
    a processor; and
    memory operatively coupled to the processor and storing computer readable instructions that, when executed by the processor, cause the printing apparatus to function as:
        a first judging unit to determine whether the print job provided by the user through the information processing apparatus includes first security information, which is specified by the user to prevent contents of the print data from being disclosed and includes a print password, independent from the thumbnail registration password to be verified by input from the user before the image is formed, and the first user information; and
        a first display control unit to display the user-specific thumbnail image stored in the first storage unit in the displaying device when the first judging unit determines that the print job provided by the user includes the first security information and the first user information,
        wherein the first display control unit displays the security-unspecific thumbnail image, which is one of appended to the print data and created based on the contents of the print data when the first judging unit determines that the print job provided by the user does not include at least one of the first security information and the first user information.

2. The printing apparatus according to claim 1,
    wherein the operation of the printing apparatus is configured to be performed in a secure printing mode, in which the contents of the print data are restricted from being disclosed by the first security information;
    wherein the memory stores further computer readable instructions that, when executed by the processor, cause the printing apparatus to function as:
        a first security setting unit, by which the secure printing mode is one of selectively activated and selectively de-activated, and
        a registration judging unit, which determines whether the first user information included in the print job is stored in the first storage unit in association with the user-specific thumbnail image; and
    wherein the first display control unit displays a user-unspecific thumbnail image in the displaying device when the secure printing mode is activated and the registration judging unit determines that the first user information included in the print job is absent in the first storage unit.

3. The printing apparatus according to claim 2,
wherein the user-specific thumbnail is displayed by the first display control unit in a secure display setting, which configured to be activated when the secure printing mode is activated; and
wherein the memory stores further computer readable instructions that, when executed by the processor, cause the printing apparatus to function as
a second security setting unit, by which the secure display setting is one of selectively activated and selectively de-activated.

4. The printing apparatus according to claim 1, wherein the memory stores further computer readable instructions that, when executed by the processor, cause the printing apparatus to function as:
a registration unit, in which the first user information is entered in association with the user-specific thumbnail image to be registered and with the thumbnail registration password in the first storage unit.

5. The printing apparatus according to claim 4,
wherein one or more attributes of the user-specific thumbnail image are customizable based on user input, and
wherein the one or more attributes of the user-specific thumbnail image comprise one or more of a location of an image to be used as the user-specific thumbnail image and a data format of print data to be represented by the user-specific thumbnail image.

6. The printing apparatus according to claim 4,
wherein the registration unit registers the user-specific thumbnail image on the basis of a format of the print data; and
wherein the first display control unit displays the user-specific thumbnail image according to the first user information and the format of the print data.

7. The printing apparatus according to claim 1, further comprising:
a second storage unit configured to store second security information, which authenticates the user, in association with the second user information, which identifies the user;
an information entry unit, configured to accept entry of information concerning authentication and identification of the user; and
an entry activation unit, configured to activate the information entry unit according to an operation from the user,
wherein the memory stores further computer readable instructions that, when executed by the processor, cause the printing apparatus to function as:
a second judging unit determine whether the information accepted by the information entry unit coincides with the second security information being stored in the second storage unit in association with the second user information; and
a second display control unit to display a representative thumbnail image in the displaying device, the representative thumbnail image being created based on the contents of the print data including the first user information which coincides with the second user information, when the second judging unit determines that the information accepted by the information entry unit coincides with the second security information being stored in the second storage unit in association with the second user information.

8. A printing system to process a print job to form an image on a recording medium, comprising:
an information processing apparatus, configured to generate print data including image data to represent the image to be formed;
a printing apparatus configured to process the print job provided from the information processing apparatus,
wherein the information processing apparatus comprises:
a first processor; and
first memory operatively coupled to the first processor and storing computer readable instructions that, when executed by the first processor, cause the information processing apparatus to function as:
an information appending unit to append first user information, which identifies a user who uses the information processing apparatus to provide the print job to the printing apparatus and is protected by a thumbnail registration password, and first security information, which is specified by a user to prevent contents of the print data from being disclosed and includes a print password, independent from the thumbnail registration password, to be verified by input from the user before the image is formed, to the print job, wherein the first security information comprises a user-specific thumbnail image; and
wherein the printing apparatus comprises:
a printing unit configured to form the image on the recording medium according to be print data;
a displaying device configured to display information concerning air operation of the printing apparatus;
a first storage unit configured to store the first user information in association with a user-specific thumbnail image, which is to be displayed in the displaying device to identify the print job provided by the user, and to store a security-unspecific thumbnail image without being associated with any user;
a second processor; and
second memory operatively coupled to the second processor and storing computer readable instructions that, when executed by the second processor, cause the printing apparatus to function as:
a first judging unit to determine whether the print job provided by the user through the information processing apparatuses includes the first security information and the first user information; and
a first display control unit to display the user-specific thumbnail image stored in the first storage unit in the displaying device when the first judging unit determines that the print job provided by the user includes the first security information and the first user information,
wherein the first display control unit displays the security-unspecific thumbnail image, which is one of appended to the print data and created based on the contents of the print data when the first judging unit determines that the print job provided by the user does not include at least one of the first security information and the first user information.

9. The printing system according to claim 8,
wherein the operation of the printing apparatus is configured to be performed in a secure printing mode, in which the contents of the print data is restricted from being disclosed by the first security information;
wherein the memory stores further computer readable instructions that, when executed by the processor, cause the printing apparatus to function as a first security setting unit, by which the secure printing mode is one of selectively activated and selectively de-activated, and a registration judging unit, which determines whether the first user information included in the print job is stored in the first storage unit in association with the user-specific thumbnail image;

wherein the first display control unit displays a user-unspecific thumbnail image in the displaying device when the secure printing mode is activated and the registration judging unit determines that the first user information included in the print job is absent in the first storage unit.

10. The printing system according to claim 9, wherein the user-specific thumbnail is displayed by the first display control unit in a secure display setting, which is configured to be activated when the secure printing mode is activated; and wherein the memory stores further computer readable instructions that, when executed by the processor, cause the printing apparatus to function as a second security setting unit, by which the secure display setting is one of selectively activated and selectively de-activated.

11. The printing system according to claim 8, wherein the memory stores further computer readable instructions that, when executed by the processor, cause the printing apparatus to function as:

a registration unit, in which the first user information is entered in association with the user-specific thumbnail image to be registered and with the thumbnail registration password in the first storage unit.

12. The printing system according to claim 11, wherein one or more attributes of the user-specific thumbnail image are customizable based on user input, and wherein the one or more attributes of the user-specific thumbnail image comprise one or more of a location of an image to be used as the user-specific thumbnail image and a data format of print data to be represented by the user-specific thumbnail image.

13. The printing system according to claim 11, wherein the registration unit registers the user-specific thumbnail image on the basis of a format of the print data; and wherein the first display control unit displays the user-specific thumbnail image according to the first user information and the format of the print data.

14. The printing system according to claim 8, further comprising:

a second storage unit configured to store second security information, which authenticates the user, in association with second user information, which identifies the user;

an information entry unit, configured to accept entry of information concerning authentication and identification of the user;

an entry activation unit, configured to activate the information entry unit according to an operation from the user, wherein the memory stores further computer readable instructions that, when executed by the processor, cause the printing apparatus to function as:

a second judging unit to determine whether the information accepted by the information entry unit coincides with the second security information being stored in the second storage unit in association with the second user information; and a second display control unit to display a representative thumbnail image in the displaying device, the representative thumbnail image being created based on the contents of the print data including the first user information which coincides with the second user information, when the second judging unit determines that the information accepted by the information entry unit coincides with the second security information being stored in the second storage unit in association with the second user information.

15. A displaying device to display a thumbnail image representing an image that is different in size from an image to be printed by a printing system which comprises the displaying device, the displaying device comprising:

a displaying unit;

a first storage unit configured to store first user information, which identifies a user of the different-sized image and is protected by a thumbnail registration password, in association with a user-specific thumbnail image, which is to be displayed in the displaying unit to identify the different-sized image, and to store a security-unspecific thumbnail image without being associated with any user;

a processor; and memory operatively coupled to the processor and storing computer readable instructions that, when executed by the processor, cause the displaying device to function as:

a first judging unit to determine whether a data file representing the different-sized image includes first security information, which is specified by the user to prevent contents of the different-sized image from being disclosed and includes a print password, independent from the thumbnail registration password, to be verified by input from the user before the image is formed, and the first user information; and a first display control unit to display the user-specific thumbnail image stored in the first storage unit when the first judging unit determines that the data file representing the different-sized image includes the first security information and the first user information, wherein the first display control unit displays the security-unspecific thumbnail image, which is one of appended to a print data and created based on the contents of the print data when the first judging unit determines that a print job provided by the user does not include at least one of the first security information and the first user information.

16. A method to control displaying a thumbnail image representing a print job, comprising:

generating print data including image data to represent an image to be formed in the print job;

storing first security information, which is specified by a user to prevent contents of the print data from being disclosed and includes a print password to be verified by input from the user before the image is formed, in a first storage unit in association with a user-specific thumbnail image, which is to be displayed in a displaying device to identify the print job provided by the user;

storing a security-unspecific thumbnail image in the first storage unit without being associated with any user;

appending the first security information and first user information, which identifies the user and is protected by a thumbnail registration password, independent from the print password, to the print job;

judging whether the print job provided by the user includes the first security information and the first user information;

controlling display of the user-specific thumbnail image stored in the first storage unit in the displaying device when it is judged that the print job provided by the user includes the first security information and the first user information; and controlling display of the security-unspecific thumbnail image, which is one of appended to the print data and created based on the contents of the print data when it is judged that the print job provided by the user does not include at least one of the first security information and the first user information.

17. A non-transitory computer readable medium comprising instructions that, when executed by a processor, control a computer to display a thumbnail image representing a print job, comprising steps of:

generating print data including image data to represent an image to be formed in the print job;

storing first security information, which is specified by a user to prevent contents of the print data from being disclosed and includes a print password to be verified by input from the user before the image is formed, in a first storage unit in association with a user-specific thumbnail image, which is to be displayed in a displaying device of the computer to identify the print job provided by the user;

storing a security-unspecific thumbnail image in the first storage unit without being associated with any user;

appending the first security information and first user information, which identifies the user and is protected by a thumbnail registration password, independent from the print password, to the print job;

judging whether the print job provided by the user includes the first security information and the first user information;

controlling display of the user-specific thumbnail image stored in the first storage unit in the displaying device when it is judged that the print job provided by the user includes the first security information and the first user information; and controlling display of the security-unspecific thumbnail image, which is one of appended to the print data and created based on the contents of the print data when it is judged that the print job provided by the user does not include at least one of the first security information and the first user information.

* * * * *

UNITED STATES PATENT AND TRADEMARK OFFICE
CERTIFICATE OF CORRECTION

| | | |
|---|---|---|
| PATENT NO. | : 8,564,809 B2 | Page 1 of 1 |
| APPLICATION NO. | : 12/189855 | |
| DATED | : October 22, 2013 | |
| INVENTOR(S) | : Daisuke Asai | |

It is certified that error appears in the above-identified patent and that said Letters Patent is hereby corrected as shown below:

On the Title Page, item 73 Assignee:
        Insert --Kaisha-- after "Brother Kogyo Kabushiki".

Signed and Sealed this
Seventeenth Day of June, 2014

Michelle K. Lee
*Deputy Director of the United States Patent and Trademark Office*